United States Patent
Anderson et al.

(10) Patent No.: US 7,606,530 B1
(45) Date of Patent: Oct. 20, 2009

(54) RFID SYSTEM FOR ALLOWING ACCESS TO REMOTELY POSITIONED RFID TAGS

(75) Inventors: Eric N. Anderson, Cedar Rapids, IA (US); Alan E. Siniff, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 738 days.

(21) Appl. No.: 11/372,652

(22) Filed: Mar. 11, 2006

(51) Int. Cl.
*H04B 3/36* (2006.01)
*H04B 7/14* (2006.01)
*H04B 7/00* (2006.01)

(52) U.S. Cl. ......................................... 455/7; 455/41.2
(58) Field of Classification Search ................. 455/41.2
See application file for complete search history.

(56) References Cited

U.S. PATENT DOCUMENTS

| | | | |
|---|---|---|---|
| 6,212,401 B1 | 4/2001 | Ackley | |
| 6,384,712 B1 | 5/2002 | Goldman | |
| 6,700,526 B2 | 3/2004 | Witten | |
| 6,853,294 B1 | 2/2005 | Ramamurthy | |
| 7,090,125 B2 * | 8/2006 | Goel et al. | 235/383 |
| 2005/0068179 A1 | 3/2005 | Roesner | |
| 2005/0176370 A1 * | 8/2005 | McSheffrey et al. | 455/41.2 |
| 2007/0040025 A1 * | 2/2007 | Goel et al. | 235/383 |
| 2007/0080804 A1 * | 4/2007 | Hirahara et al. | 340/572.1 |
| 2007/0247315 A1 * | 10/2007 | Nagai et al. | 340/572.4 |

OTHER PUBLICATIONS

Memorandum by The Under Secretary of Defense, Subject: Radio Frequency Identification (RFID) Policy, dated Jul. 30, 2004, accessed on the internet on Mar. 1, 2006 at: http://www.acq.osd.mil/log/rfid/Policy/RFID%20Policy%2007-30-2004.pdf.

* cited by examiner

*Primary Examiner*—Matthew D Anderson
*Assistant Examiner*—Bobbak Safaipour
(74) *Attorney, Agent, or Firm*—Daniel M. Barbieri

(57) ABSTRACT

A radio frequency identification (RFID) system for allowing access to at least one remotely positioned target RFID tag. The RFID system includes an RFID repeater receiver located outside of the operable range of a target RFID tag; and, at least one RFID repeater positionable within an operable range of the target RFID tag. The RFID repeater retransmits an original inquiry from the RFID repeater receiver to the target RFID tag and retransmits a response from the target RFID tag to the RFID repeater receiver.

15 Claims, 5 Drawing Sheets

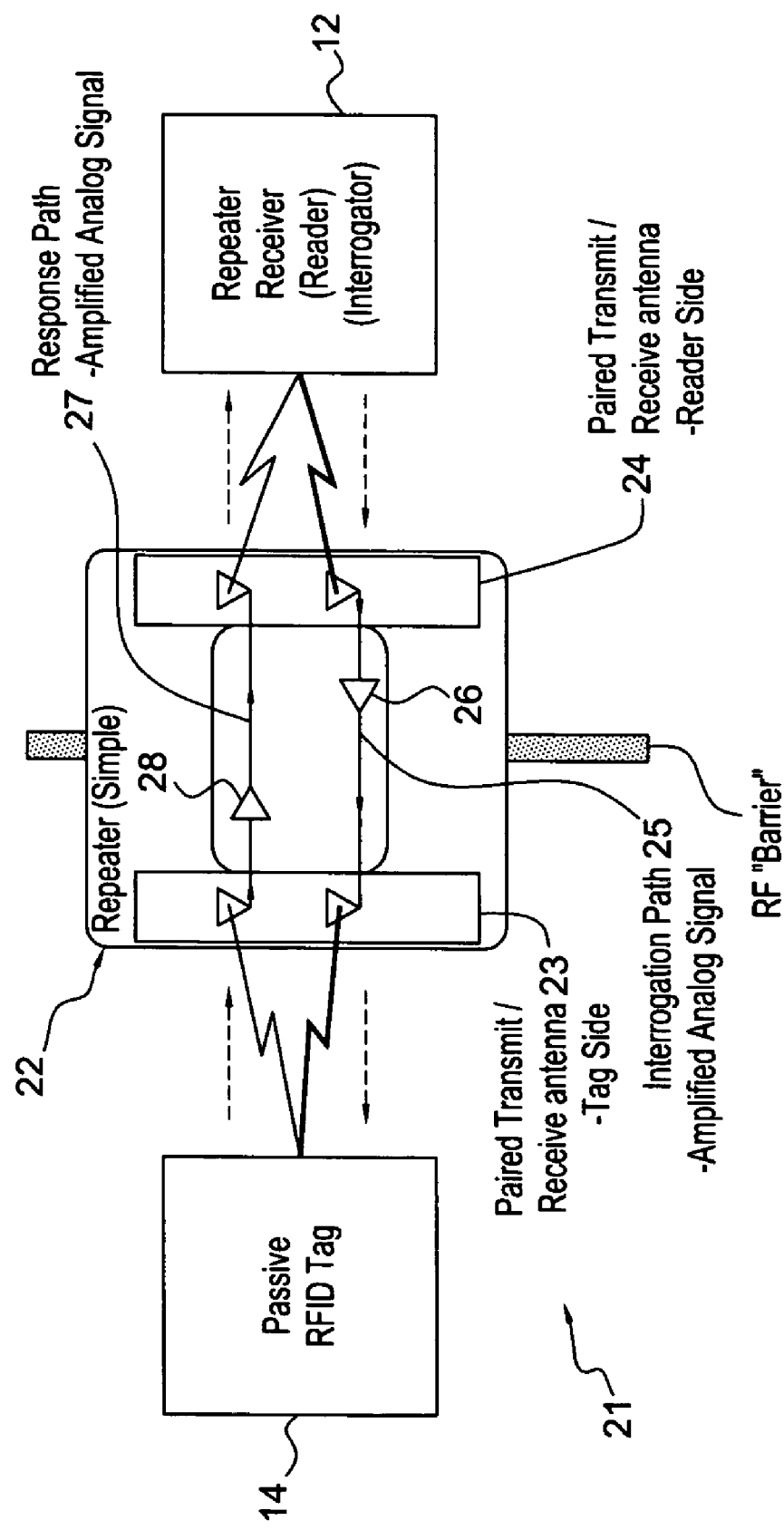

RFID SYSTEM FOR ALLOWING ACCESS TO REMOTELY POSITIONED RFID TAGS

BACKGROUND OF THE INVENTION

1. Field of the Invention

The present invention relates to automated data collection systems that collect information from radio frequency identification (RFID) tags, and more particularly to an RFID system that allows access to RFID tags outside of the operable range of an RFID reader.

2. Description of the Related Art

In the automatic data identification industry, the use of RFID tags has grown in prominence as a way to track data regarding an object to which the RFID tag is affixed. An RFID transponder generally includes a semiconductor memory in which digital information may be stored, such as an electrically erasable, programmable read-only memory (EEPROM) or similar electronic memory device.

Since RFID tags do not include a radio transceiver, they can be manufactured in very small, lightweight and inexpensive units. RFID tags that extract their power from the interrogating field are particularly cost effective since they lack a power source. In view of these advantages, RFID tags can be used in many types of applications in which it is desirable to track information regarding a moving or inaccessible object. One such application is to affix RFID tags to packages or parcels moving along a conveyor belt. The RFID tags contain stored information regarding the packages, such as the originating or destination address, shipping requirements, pick-up date, contents of the package, etc. An RFID reader disposed adjacent to the conveyor belt can recover the stored information of each RFID tag as it passes on the conveyor belt. The RFID reader may then communicate the collected information to a computer or computer network for further processing by a software application.

Methods have been identified for using RFID tags to support passive interrogation and management of installed equipment configuration and status information. These passive techniques do not require the user to power up the installed units but do require an RF path between the interrogating equipment and the installed equipment. For equipment installed in aircraft this means that access ports/doors need to be opened to the Electronic Equipment (EE)-bay and other areas where the equipment is installed. To fully survey an airplane's configuration or fault status would require the ground crew to open multiple access ports and to spend considerable time and effort to read all airplane equipment tags. This approach also requires the airplane to be on the ground and precludes data collection during taxi or other flight phases. Similarly, access to RFID tags is unavailable while items are in metal storage or shipping containers. Opening the containers is not an option during shipment.

U.S. Pat. Publicn. 20050068179, entitled "Distributed RF Coupled System," discloses an RFID sensor system that includes a conducting path having first and second conductors, and one or more RFID sensing transceivers spatially-distributed along the conducting path and capacitively-coupled to the first and second conductors. The system further includes a controller that provides an AC signal on the conducting path, and receives signals from the one or more RFID sensing transceivers. The conducting path and RFID sensing transceivers can formed in a flexible substrate and mated together.

U.S. Pat. No. 6,212,401, issued Apr. 3, 2001, entitled "Data Acquisition Using Telephone Connection," discloses a handheld scanner that incorporates a cellular telephone module. The scanner communicates with a host which serves as a reading or data distribution device. This permits the use of a cableless scanner for low powered and secure wireless transmission. The scanner is able to take advantage of the existing design features of a local cellular network. One mode of operation allows the connection to be limited to an amount of time corresponding to that required for transferring of the data.

What is desired is an RFID system that efficiently allows access to RFID tags outside of the operable range of an RFID reader by providing the ability to interrogate inaccessible tags and transferring that data to a reader system.

SUMMARY OF THE INVENTION

In a broad aspect, the present invention is a radio frequency identification (RFID) system for allowing access to at least one remotely positioned target RFID tag. The RFID system includes an RFID repeater receiver located outside of the operable range of a target RFID tag; and, at least one RFID repeater positionable within an operable range of the target RFID tag. The RFID repeater retransmits an original inquiry from the RFID repeater receiver to the target RFID tag and retransmits a response from the target RFID tag to the RFID repeater receiver.

The system of the present invention is non-invasive. The operator need not open the access panels/RF pathways. It may provide evaluations in multiple locations/equipment bays, and remote/limited access locations.

Typically, there may be a number of remotely positioned target RFID tags. In this instance, a number of internal RFID repeaters are located within the operable range of associated target RFID tags. An external RFID repeater is positioned in communication with the internal RFID repeaters and within the operable range of the RFID repeater receiver.

The repeater may be of a basic type that uses either an analog or digital internal interface. This basic repeater may, for example, use paired transmitter/receiver units to allow queries and responses to be passed from one side of the RF shield to the other.

A more advanced repeater involves the integration of a controller into the repeater module and various logic systems (centralized or distributed) for marshalling or coordinating queries and responses between the various elements of the RFID system.

BRIEF DESCRIPTION OF THE DRAWINGS

FIG. 2A shows the basic RFID system with a simplified schematic representation of a first embodiment of a repeater that can be used with this basic RFID system, this first embodiment having an analog internal interface.

The same elements or parts throughout the figures of the drawings are designated by the same reference characters, while equivalent elements bear a prime designation.

DETAILED DESCRIPTION OF THE INVENTION

Figure 1:
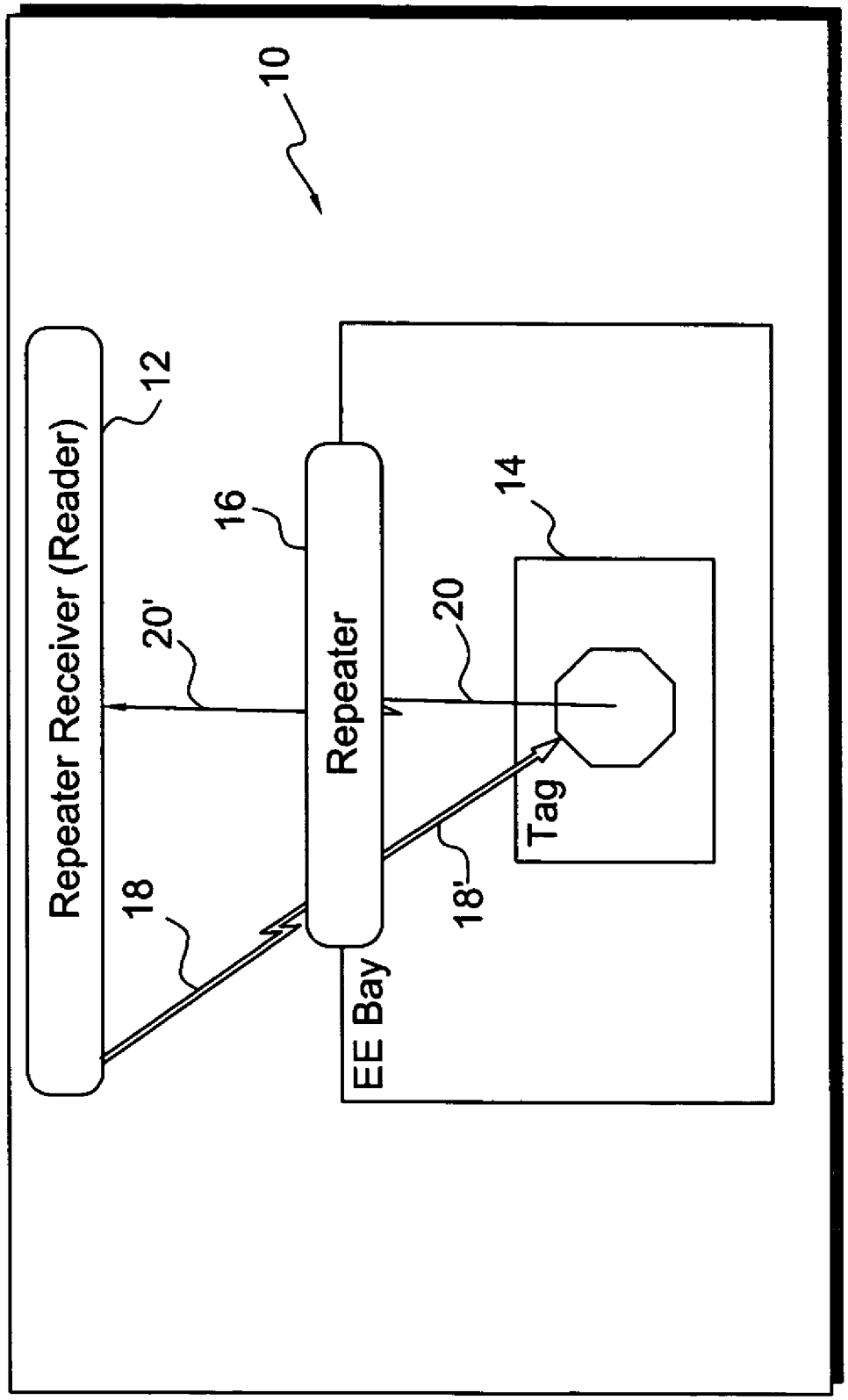
FIG. 1 is a schematic representation of a basic RFID system of the present invention that uses a first level RFID repeater.

Referring now to the drawings and the characters of reference marked thereon, FIG. 1 illustrates a simplified illustration of the RFID system of the present invention, designated generally as 10. The RFID system 10 includes an RFID repeater receiver 12 (or "reader") located outside of the operable range of a remotely positioned target RFID tag 14. The RFID repeater receiver 12 may be, for example, a conventional RFID reader that supports the specific operating modes and frequencies of the RFID tags selected by the end user. For example, in the avionics industry this may initially include systems compatible with the appropriate industry specifications (Air Transport Association Spec 2000 e-business standard and possibly the Electronic Product Code (EPC) data format) operating at 13.56 Mhz (and possibly 915 Mhz). RFID readers for avionics systems will need to initially support passive tags and remain compatible with active tags. Some readers may need to support both read and write functions to the RFID tags.

A reader is a radio frequency (RF) transmitter and receiver, controlled by a microprocessor or digital signal processor. The reader, using an attached antenna, captures data from tags then passes the data to a computer for processing. As with tags, readers come in a wide range of sizes and offer different features. Readers can be affixed in a stationary position (for example, beside a conveyor belt in a factory or dock doors in a warehouse), portable (integrated into a mobile computer that also might be used for scanning bar codes), or even embedded in electronic equipment such as print-on-demand label printers.

The target RFID tag 14 is an integrated circuit (IC) attached to an antenna—typically a small coil of wires—plus some protective packaging (e.g. a plastic card) as determined by the application requirements. RFID tags can come in many forms and sizes. Some can be as small as a grain of rice. Data is stored in the IC and transmitted through the antenna to the reader. The RFID tag may be active (self-powered by a battery) or passive (no battery). An initial embodiment for avionics systems may include passive smart tags that operate in the 13.56 MHz frequency range. Tags should adhere to ATA and EPC data formats. Initial avionics use will be read only though read/write tags with up to 64K of memory may be considered for some applications. The repeater concept of this invention may be applicable to any RFID tag type including read/write and is not limited by design frequency range of the tag or the data formats. The repeater system and the tag need to have compatible frequency ranges. The repeater design may also need to be compatible with the RFID reader/tag data format in some implementations. Use of RFID repeaters in industries/applications outside of avionics will be compatible with the capabilities, formats and frequency ranges of the associated RFID systems in which they are implemented.

The RFID tag 14 could be of a type commonly referred to as a "smart label." A smart label includes an adhesive label that is embedded with an ultra-thin RFID tag "inlay" (the tag IC plus printed antenna). Smart labels combine the read range and unattended processing capability of RFID with the convenience and flexibility of on-demand label printing. Smart labels also can be pre-printed and pre-coded for use. In on-demand applications, the tag inlay can be encoded with fixed or variable data and tested before the label is printed, while the label can contain all the bar codes, text, and graphics used in established applications. Smart labels are called "smart" because of the flexible capabilities provided by the silicon chip embedded in the tag inlay. A read/write smart label also can be programmed and reprogrammed in use, following initial coding during the label production process.

As noted above, the RFID repeater receiver 12 is located outside of the operable range of a remotely positioned target RFID tag 14. As used herein the term "remotely positioned" means that there is no direct RF path between the receiver 12 and the tag 14. Thus, for example, even though a tag 14 may be located just on the other side of a metal access panel, and thus "physically" close, there is no path for RF energy to reach the tag and it is therefore deemed remotely positioned.

An RFID repeater 16 is positionable within an operable range of the target RFID tag 14. The RFID repeater 16 retransmits an original inquiry 18 from the RFID repeater receiver to the target RFID tag 14 (as shown by numeral designation 18') and retransmits a response 20 from the target RFID tag 14 to the RFID repeater receiver 12 (as shown by numeral designation 20').

In a basic aspect, the repeater may include a paired transmitter and receiver mounted within an operable range of the RFID reader, a paired transmitter and receiver mounted within operable range of the RFID tag, a communications path from the receiver mounted within operational range of the RFID reader and the transmitter, mounted within operational range of the RFID tag, and a communications path from the receiver mounted within operational range of the RFID tag and the transmitter mounted within operational range of the RFID reader.

The communication paths may be analog connections between the elements, direct digital connections between the elements or a network with either centralized or distributed signal processing elements.

Referring now to FIG. 2A, an embodiment of an RFID system, designated generally as 21 is illustrated, that uses an analog internal interface. In this instance, the RFID repeater, designated generally as 22 includes a tag side paired transmit/receive antenna (TSPTA) 23 and a repeater receiver side paired transmit/receive antenna (RRSPTA) 24. An interrogation path 25 is positioned between the TSPTA 23 and the RRSPTA 24. The interrogation path 25 includes an interrogation path amplifier 26 for amplifying the original inquiry to provide an amplified analog signal for the TSPTA 23. A response path 27 is positioned between the TSPTA 23 and the RRSPTA 24. The response path includes a response path amplifier 28 for amplifying the response from the target to provide an amplified analog signal for the RRSPTA 24. The RFID tag 14 used in this embodiment is passive.

Figure 2B:
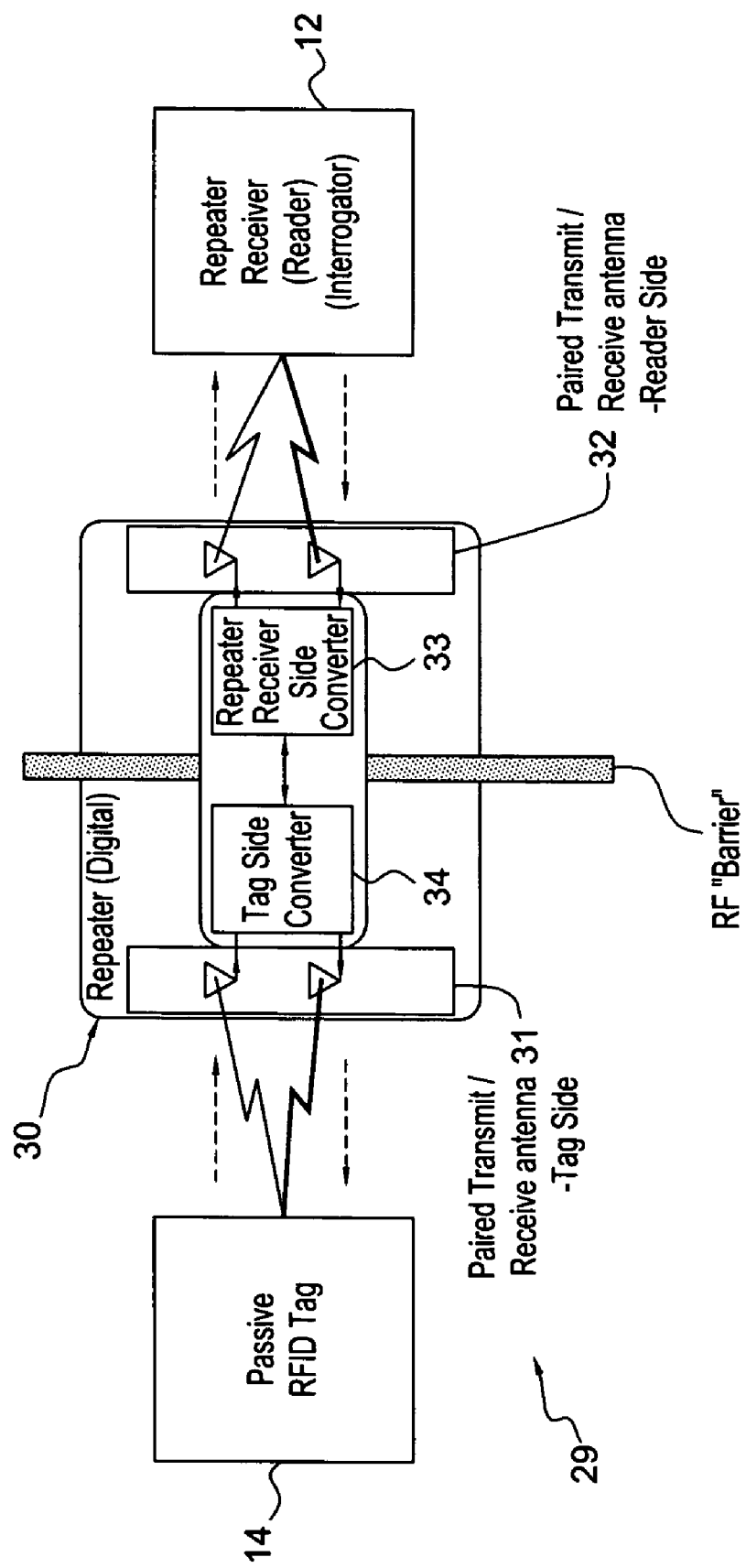
FIG. 2B shows the basic RFID system with a simplified schematic representation of a second embodiment of a repeater that can be used with this basic RFID system, this second embodiment having a digital internal interface.

Referring now to FIG. 2B, an embodiment of an RFID system, designated generally as 29 is illustrated, that uses a digital internal interface. In this instance, the RFID repeater, designated generally as 30 includes a tag side paired transmit/receive antenna (TSPTA) 31 and a repeater receiver side paired transmit/receive antenna (RRSPTA) 32. A repeater receiver side converter 33 receives an original inquiry from the RRSPTA 32 and converts the original inquiry to a digital signal. A tag side converter 34 receives the original converted digital signal and converts it to an original converted analog signal for transmission by the TSPTA 31. Again, the RFID tag 14 used in this embodiment is passive.

Figure 3:
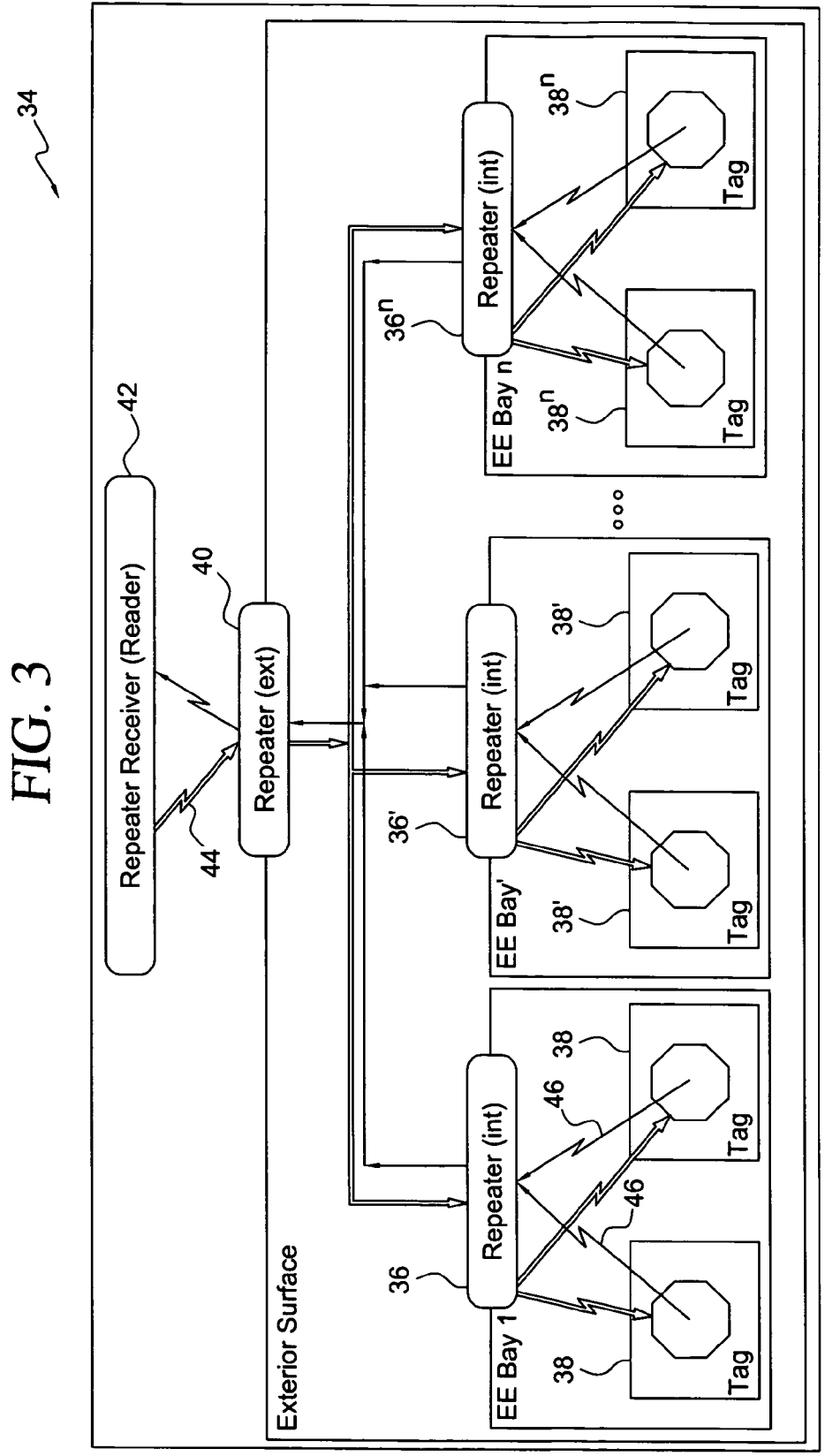
FIG. 3 is a representation of a more complex RFID system of the present invention, which utilizes external RFID repeaters and internal RFID repeaters to provide operability.

Referring now to FIG. 3, a representation of a more complex RFID system of the present invention is illustrated, designated generally as 34. In this embodiment, a number of internal RFID repeaters 36, 36', ... 36" are utilized. Each of the internal RFID repeaters 36 are located within the operable range of a set of associated target RFID tags 38, 38', ... 38". An external RFID repeater 40 is positioned in communication with the internal RFID repeaters 36, 36', ... 36" and within the operable range of the RFID repeater receiver 42 so that the external RFID repeater 40 retransmits the original inquiry 44 from the RFID repeater receiver 42 to the remotely positioned target RFID tags 38, 38', ... 38" via the internal RFID repeaters 36, 36', ... 36". Responses 46 from each of the remotely positioned target RFID tags 38, 38', ... 38", are retransmitted, via their associated internal RFID repeaters 36, 36', ... 36", to the RFID repeater receiver 42.

Figure 4:
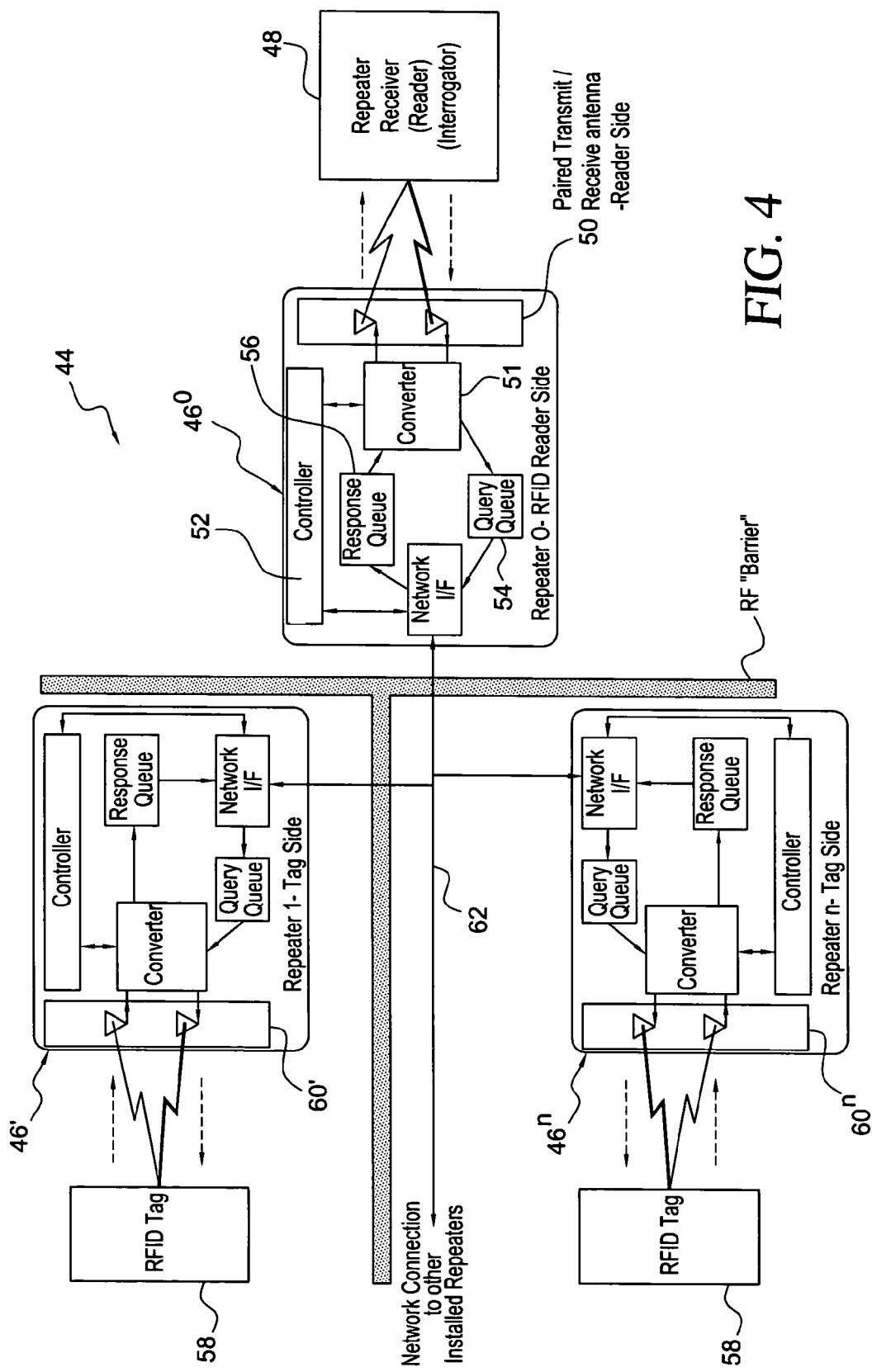
FIG. 4 is a more detailed representation of a multiple active repeater system showing simplified schematic illustrations of the active repeaters therein.

More advanced systems require a more complex embodiment of a repeater. Referring now to FIG. 4, an RFID system, designated generally as 44, is illustrated, including such more advanced repeaters, designated generally as 46⁰, 46', ... 46". The repeater receiver (reader) side advanced repeater 46⁰ is within operable range of the RFID repeater receiver (reader) 48. It includes a repeater receiver side paired transmit/receive antenna (RRSPTA) 50. A repeater receiver side converter 51 receives an original inquiry from the RRSPTA 50 and converts the original inquiry to a digital signal. A suitable repeater receiver side controller 52 in operative association with the repeater receiver side converter 51 provides signal processing/queuing logic for managing and organizing queries 54 and responses 56 to and from the RFID tags 58 in the multiple areas of interest.

Multiple advanced repeaters 46' ... 46" having associated sets of tag side paired transmit/receive antennae (TSPTA) 60' ... 60" are distributed throughout multiple areas of interest within operable range of RFID tag located within the volume of interest. A network interface/communication path 62 is provided between the paired transmitter and receiver 46⁰ mounted within operable range of the RFID reader 48 and the multiple sets of tag side paired transmitters and receivers 60' ... 60" distributed throughout multiple areas of interest.

As noted above, additional embodiments of the concept are possible and may or may not include various communication mechanisms, and various logic systems (centralized or distributed) for marshalling or coordinating queries and responses between the various elements of the repeater system.

A repeater system could also support or limit write access to read write RFID tags. A preferred embodiment would be to support all standard RFID reader/Tag interactions though some limitations (such as no writing) may be desirable in some implementations.

Although the inventive principles herein have been discussed in detail stressing avionics applications this invention can be used in many potential applications. For example, this RFID system may be used to inventory contents of a sealed steel shipping container, railroad car, or trailer. The metal of the container normally prevents transmission of RFID responses. However, the RFID system installed through the door or wall would allow interrogation without opening the container. This system can also support the U.S. Department of Defense RFID policy requiring use of tags on shipping containers and also for individual high-value items within those containers. This policy is noted in the Memorandum by The Under Secretary of Defense, Subject: Radio Frequency Identification (RFID) Policy, dated Jul. 30, 2004, shown at: http://www.acq.osd.mil/log/rfid/Policy/RFID%20Policy%2007-30-2004.pdf.

Other embodiments and configurations may be devised without departing from the spirit of the invention and the scope of the appended claims.

The invention claimed is:

1. A radio frequency identification (RFID) system for allowing access to at least one remotely positioned target RFID tag, comprising:

a) an RFID repeater receiver located outside of the operable range of a target RFID tag; and,
b) at least one RFID repeater positionable within an operable range of the target RFID tag, said RFID repeater for retransmitting an original inquiry from said RFID repeater receiver to the target RFID tag and for retransmitting a response from the target RFID tag to said RFID repeater receiver,
wherein said at least one RFID repeater, comprises:
  a) at least one repeater receiver side repeater, comprising
    i) a repeater receiver side paired transmit/receive antenna (RRSPTA);
    ii) a repeater receiver side converter for receiving an original inquiry from said RRSPTA and converting said original inquiry to a digital signal; and,
    iii) a repeater receiver side controller in operative association with said repeater receiver side converter for managing and organizing said original inquiry, subsequent inquiries and responses; and,
  b) at least one tag side repeater, comprising:
    i) a tag side paired transmit/receive antenna (TSPTA);
    ii) a tag side converter for receiving said original converted digital signal and converting it to an original converted analog signal for transmission by said TSPTA; and,
    iii) a tag side controller in operative association with said tag side converter for managing and organizing said original inquiry, subsequent inquiries and responses,
  wherein said tag side converter converts responses received from said TSPTA and provides a digital signal for transmission by said RRSPTA.

2. The RFID system of claim 1, wherein said at least one remotely positioned target RFID tag comprises a plurality of remotely positioned target RFID tags positioned on avionics equipment.

3. The RFID system of claim 1, wherein said at least one remotely positioned target RFID tag comprises a plurality of remotely positioned target RFID tags positioned on individual items within an air vehicle.

4. The RFID system of claim 1, wherein said at least one remotely positioned target RFID tag comprises a plurality of remotely positioned target RFID tags positioned on individual items located within containers, said repeaters being mounted on the exterior of the container or a vehicle containing the individual items.

5. The RFID system of claim 1, wherein said at least one remotely positioned target RFID tag comprises a plurality of remotely positioned target RFID tags positioned on avionics equipment.

6. The RFID system of claim 1, wherein said at least one remotely positioned target RFID tag comprises a plurality of remotely positioned target RFID tags positioned within sealed shipping containers.

7. A radio frequency identification (RFID) system for allowing access to a plurality of remotely positioned target RFID tags, comprising:

a) an RFID repeater receiver located outside of the operable range of a plurality of target RFID tags;
b) at least one repeater receiver side repeater, comprising:
  i) a repeater receiver side paired transmit/receive antenna (RRSPTA);
  ii) a repeater receiver side converter for receiving an original inquiry from said RRSPTA and converting said original inquiry to a digital signal; and,
  iii) a repeater receiver side controller in operative association with said repeater receiver side converter for managing and organizing said original inquiry, subsequent inquiries and responses;

c) a plurality of tag side repeaters positionable within an operable range of the target RFID tags, each tag side repeater, comprising:
  i) a tag side paired transmit/receive antenna (TSPTA);
  ii) a tag side converter for receiving said original converted digital signal and converting it to an original converted analog signal for transmission by said TSPTA; and,
  iii) a tag side controller in operative association with said tag side converter for managing and organizing said original inquiry, subsequent inquiries and responses,
  wherein said tag side converter converts responses received from said TSPTA and provides a digital signal for transmission by said RRSPTA.

8. The RFID system of claim 7, wherein said plurality of remotely positioned target RFID tags comprises a plurality of remotely positioned target RFID tags positioned in aircraft electronic equipment bays.

9. The RFID system of claim 7, wherein said at least one remotely positioned target RFID tag comprises a plurality of remotely positioned target RFID tags positioned within sealed shipping containers.

10. A method for allowing access to at least one remotely positioned target RFID tag, comprising the steps of:
  a) positioning at least one RFID repeater receiver outside of the operable range of a target RFID tag; and,
  b) positioning at least one RFID repeater within an operable range of the target RFID tag for retransmitting an original inquiry from said RFID repeater receiver to the target RFID tag and for retransmitting a response from the target RFID tag to said RFID repeater receiver,
  wherein,
  a) said step of positioning at least one RFID repeater receiver outside of the operable range of a target RFID tag, comprises positioning at least one repeater receiver side repeater outside of the operable range of a target RFID tag, said at least one repeater receiver side repeater, comprising:
    i) a repeater receiver side paired transmit/receive antenna (RRSPTA);
    ii) a repeater receiver side converter for receiving an original inquiry from said RRSPTA and converting said original inquiry to a digital signal; and,
    iii) a repeater receiver side controller in operative association with said repeater receiver side converter for managing and organizing said original inquiry, subsequent inquiries and responses; and,
  b) said step of positioning at least one RFID repeater within an operable range of the target RFID tag, comprises positioning at least one tag side repeater within an operable range of the target RFID tag, said at least one tag side repeater, comprising:
    i) a tag side paired transmit/receive antenna (TSPTA);
    ii) a tag side converter for receiving said original converted digital signal and converting it to an original converted analog signal for transmission by said TSPTA; and,
    iii) a tag side controller in operative association with said tag side converter for managing and organizing said original inquiry, subsequent inquiries and responses,
    wherein said tag side converter converts responses received from said TSPTA and provides a digital signal for transmission by said RRSPTA.

11. The method of claim 10, wherein said at least one remotely positioned target RFID tag comprises a plurality of remotely positioned target RFID tags positioned on avionics equipment.

12. The method of claim 10, wherein said at least one remotely positioned target RFID tag comprises a plurality of remotely positioned target RFID tags positioned on aircraft equipment, said repeaters being mounted on the aircraft exterior.

13. The method of claim 10, wherein said at least one remotely positioned target RFID tag comprises a plurality of remotely positioned target RFID tags positioned on avionics equipment.

14. The method of claim 10, wherein said at least one remotely positioned target RFID tag comprises a plurality of remotely positioned target RFID tags positioned within sealed shipping containers.

15. The method of claim 10, wherein said step of positioning at least one RFID repeater within an operable range of the target RFID tag, comprises positioning at least one RFID repeater within an operable range of at least one remotely positioned target RFID tag located on avionics equipment.

* * * * *